(12) United States Patent
Srinivasan et al.

(10) Patent No.: US 10,003,528 B2
(45) Date of Patent: Jun. 19, 2018

(54) SCALABLE FRAMEWORK FOR MANAGING SWITCH LINK FAILOVERS IN A SWITCH FABRIC NETWORK

(71) Applicant: Oracle International Corporation, Redwood Shores, CA (US)

(72) Inventors: Arvind Srinivasan, San Jose, CA (US); Bjorn Dag Johnsen, Oslo (NO); Shimon Muller, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 75 days.

(21) Appl. No.: 15/294,343

(22) Filed: Oct. 14, 2016

(65) Prior Publication Data
US 2018/0109443 A1    Apr. 19, 2018

(51) Int. Cl.
*H04L 12/703*  (2013.01)
*H04L 12/707*  (2013.01)
*H04L 12/741*  (2013.01)
*H04L 12/947*  (2013.01)

(52) U.S. Cl.
CPC ........... *H04L 45/28* (2013.01); *H04L 45/22* (2013.01); *H04L 45/745* (2013.01); *H04L 49/25* (2013.01)

(58) Field of Classification Search
CPC ....................................................... H04L 12/28

USPC ......................................................... 370/329
See application file for complete search history.

(56) References Cited

U.S. PATENT DOCUMENTS

| 7,719,969 B1 | 5/2010 | Dropps | |
|---|---|---|---|
| 7,783,788 B1 | 8/2010 | Quinn | |
| 2004/0085955 A1* | 5/2004 | Walter | H04L 63/0428 370/386 |

* cited by examiner

*Primary Examiner* — Dang Ton
(74) *Attorney, Agent, or Firm* — Park, Vaughan, Fleming & Dowler LLP

(57) ABSTRACT

The disclosed system handles a switch link failure in a switch fabric network. When a node in the switch fabric network detects a failure of a switch link coupled to the node, the system remaps traffic that is directed to a logical port number, which is currently mapped to a primary physical port number associated with the failed switch link, to a secondary physical port number associated with the alternative switch link. This remapping involves performing a lookup in a local mapping table at the node, wherein the local mapping table stores associations between logical port numbers and physical port numbers, wherein for each logical port number, the mapping table includes a primary physical port number and one or more secondary physical port numbers, which are associated with alternative switch links. The system notifies a subnet manager for the switch fabric network about the link failure and the remapping.

20 Claims, 8 Drawing Sheets

SCALABLE FRAMEWORK FOR MANAGING SWITCH LINK FAILOVERS IN A SWITCH FABRIC NETWORK

RELATED APPLICATION

The subject matter of this application is related to the subject matter in a co-pending non-provisional application entitled "Scalable Framework for Managing QoS Requirements after a Switch Link Failover in a Switch Fabric Network," by inventors Arvind Srinivasan, Bjorn Johnsen and Shimon Muller, having Ser. No. 15/294,352, and filed on 14 Oct. 2016.

BACKGROUND

Field

The disclosed embodiments relate to the design of a switch fabric network that facilitates high-performance communication among computing nodes, such as servers and storage devices. More specifically, the disclosed embodiments relate to the design of a scalable framework that facilitates managing a switch link failover in a switch fabric network.

Related Art

High-performance enterprise computing systems typically include large numbers of servers interconnected by a switch fabric network, which is responsible for communicating packets to and from the servers. Each of these servers can potentially run multiple virtual machines (VMs) and associated virtualized applications, and the network packet streams generated by these servers are directed to different system resources that the VMs and associated virtualized applications need to access. In general, traffic streams to and from various VMs have differing throughput and latency requirements, and also have different requirements for traffic isolation and policy enforcement.

Unlike Ethernet networks, commonly used switch fabric networks, such as an InfiniBand™ switch fabric network, are managed centrally, for example by a subnet manager (SM). The SM is responsible for assigning local identifiers to various nodes and setting up associated forwarding tables within nodes in the switch fabric.

If a switch link in the switch fabric fails, a failover mechanism is typically used to move the traffic from the failed link to another link. From a switch's perspective in an InfiniBand™ switch fabric network, this failover process involves: (1) notifying the SM about the failure; (2) waiting for the SM to rediscover the network topology and reroute communications to generate updated forwarding tables; and (3) receiving the updated forwarding tables from the SM. This can be an extremely time-consuming process, during which an application may experience a complete or intermittent loss of traffic, and may have to reestablish its connections. Moreover, in larger switch fabrics that use inter-switch links to connect multiple subnets, a failover can take even longer because multiple SMs are involved and require additional coordination.

Hence, what is needed is a technique for handling a switch link failure in a switch fabric network that does not suffer from the above-described drawbacks of existing techniques.

SUMMARY

The disclosed embodiments provide system that handles a switch link failure in a switch fabric network. When a node in the switch fabric network detects a failure of a switch link coupled to the node, the system remaps traffic that is directed to a logical port number, which is currently mapped to a primary physical port number associated with the failed switch link, to a secondary physical port number associated with the alternative switch link. This remapping involves performing a lookup in a local mapping table at the node, wherein the local mapping table stores associations between logical port numbers and physical port numbers, and wherein for each logical port number, the mapping table includes a primary physical port number and one or more secondary physical port numbers, which are associated with alternative switch links. Finally, the system notifies a subnet manager (SM) for the switch fabric network about the link failure and the remapping.

In some embodiments, during a system-initialization phase prior to detecting the failure of the switch link, the system performs a fabric-discovery operation from the SM to discover a topology of the switch fabric network. Next, the system routes traffic paths through the switch fabric network based on the discovered topology, wherein routing the traffic paths also involves determining alternative switch links for switch links that fail. The system then uses the traffic paths and alternative switch links to construct local forwarding and mapping tables for nodes in the switch fabric network. Finally, the system communicates the local forwarding and mapping tables from the SM to the nodes in the switch fabric network.

In some embodiments, determining the alternative switch links involves ensuring that cycles are not created by the alternative switch links.

In some embodiments, after the SM is notified about the switch link failure and associated remapping, the system updates a locally stored topology of the switch fabric network at the SM to account for the switch link failure. Next, the system routes updated traffic paths through the switch fabric network based on the updated topology, which also involves determining updated alternative switch links for switch links that fail. The system then uses the updated traffic paths and updated alternative switch links to construct updated local forwarding and mapping tables for nodes in the switch fabric network. Finally, the system communicates the updated local forwarding and mapping tables from the SM to the nodes in the switch fabric network.

In some embodiments, the node in the switch fabric comprises: a switch in the switch fabric network; or an end node in the switch fabric network, wherein the end node can be a server or a storage device.

In some embodiments, the switch fabric network comprises an InfiniBand™ switch fabric network.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Switch Fabric Network

Figure 1:
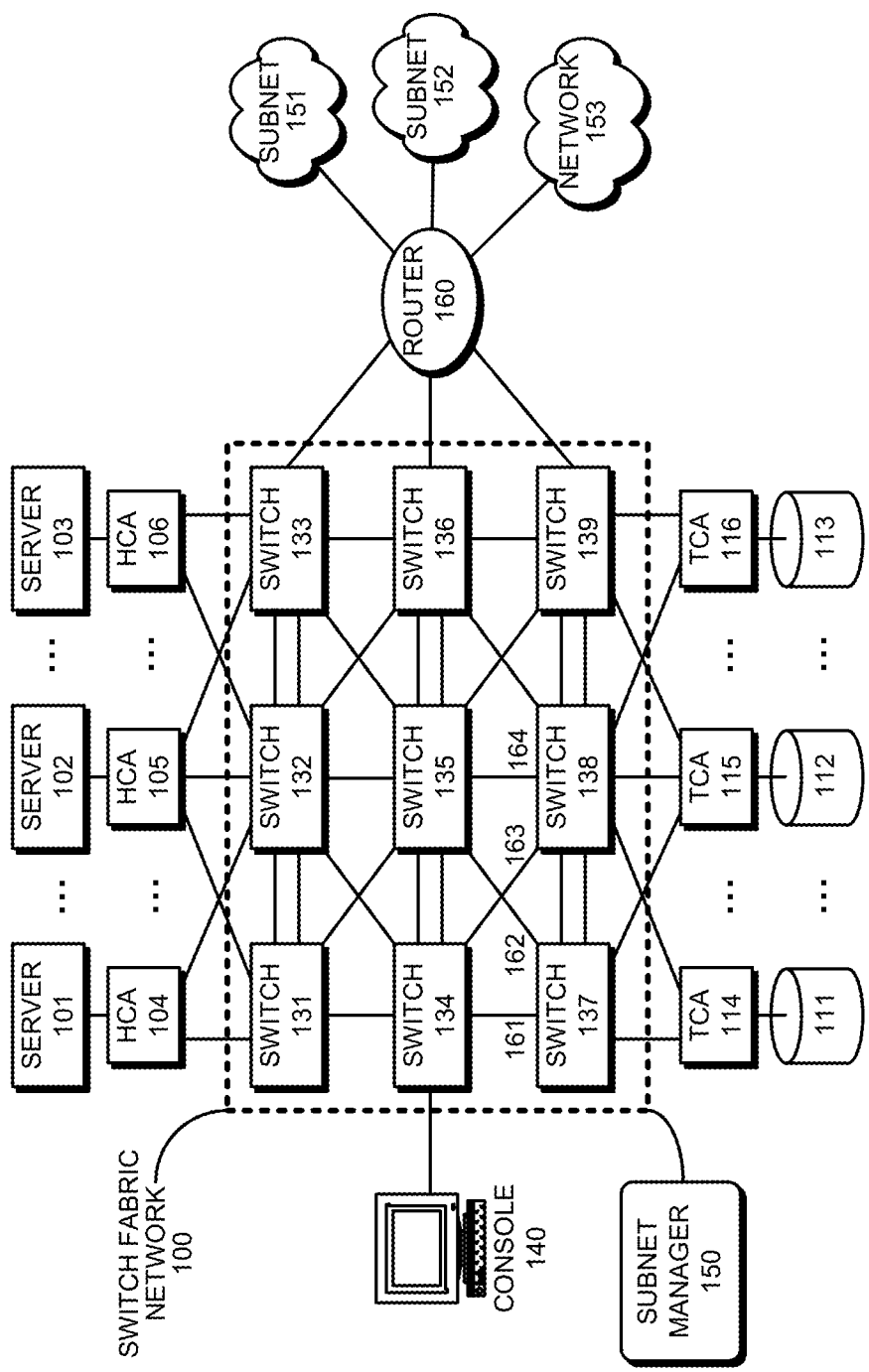
FIG. 1 illustrates an exemplary switch fabric network in accordance with the disclosed embodiments.

FIG. 1 illustrates an exemplary switch fabric network 100 in accordance with the disclosed embodiments. Switch fabric network 100 includes a number of switches 131-139, which are interconnected by "switch links" that connect switches 131-139. Switch fabric network 100 is also connected to various servers 101-103 and storages devices 111-113. More specifically, switch fabric network 100 is connected through host channel adapters (HCAs) 104-106 to servers 101-103, respectively, and is also connected through target channel adapters (TCAs) 114-116 to storage devices 111-113, respectively. All of the nodes in switch fabric network 100, including switches, HCAs and TCAs, operate under control of a subnet manager (SM) 150, which is responsible for performing routing operations and otherwise managing communications among nodes in a local subnet within switch fabric network 100. In general, SM 150 can reside at any node in switch fabric network 100, or alternatively can reside in a separate system console 140, which is coupled to switch fabric network 100. Switch fabric network 100 is also connected through a router 160 to other subnets 151-152, and to an external network 153, such as the Internet.

During system initialization, SM 150 maps the topology of switch fabric network 100 during a fabric-discovery process, and also configures traffic paths by configuring various local forwarding tables stored at nodes in switch fabric network 100. A typical failover of a switch link involves intervention of SM 150 after the link has failed. This failover can be triggered by a node issuing a trap to SM 150. In response to the trap, SM 150 performs another discovery operation on the fabric to obtain the current state of switch fabric network 100. Next, SM 150 reroutes traffic through switch fabric network 100 based on the current state of switch fabric network 100 and reprograms various forwarding tables accordingly. Note that this rerouting operation can be extremely time-consuming for sizable networks. Moreover, network traffic is typically disrupted for a significant period of time as the failover and recovery operations take place. Unfortunately, this disruption can cause problems for some latency-sensitive applications.

The disclosed embodiments provide a framework for managing switch link failures without significant disruptions during switch link failover operations. During system initialization, as the switch fabric is discovered and configured (either by a network administrator and/or by SM 150), various switch links that are provided for redundancy purposes are marked. Once the discovery process is complete, each switch receives an additional mapping table that maps each logical port number to a primary physical port number, and also one or more secondary physical port numbers associated with failover ports for the primary port.

When the primary port fails, the switch autonomously switches traffic from the failed port to a corresponding pre-identified secondary port. In this way, the failover takes place rapidly through local operations performed at the switch, and the network traffic does not get significantly delayed while waiting for SM 150 to perform rerouting operations. Next, the switch notifies SM 150 "after the fact" about the change by means of a trap. This notification gets SM 150 back in sync with the current state of switch fabric network 100 and enables SM 150 to perform additional rerouting operations if necessary. For example, referring to FIG. 1, suppose switch link 161 is a primary link, and switch link 162 is the corresponding secondary link. If switch 134 reboots and becomes temporarily unavailable, switch link 161, which is connected to switch 134, fails over to switch link 162, and switch link 163, which is also connected to switch 134, fails over to switch link 164. SM 150 is subsequently informed of the failover operations at a later time.

During the failover process, the switch always forwards traffic to the same logical port number irrespective of whether the primary physical port or the secondary physical port is actually used to carry the traffic. A lower-level switch handles the mapping from logical to physical ports by using a local mapping table, which stores associations between logical port numbers and physical port numbers. For each logical port number, this mapping table includes a primary physical port number for a primary switch link and one or more secondary physical port numbers, which are associated with alternative switch links.

Figure 2:
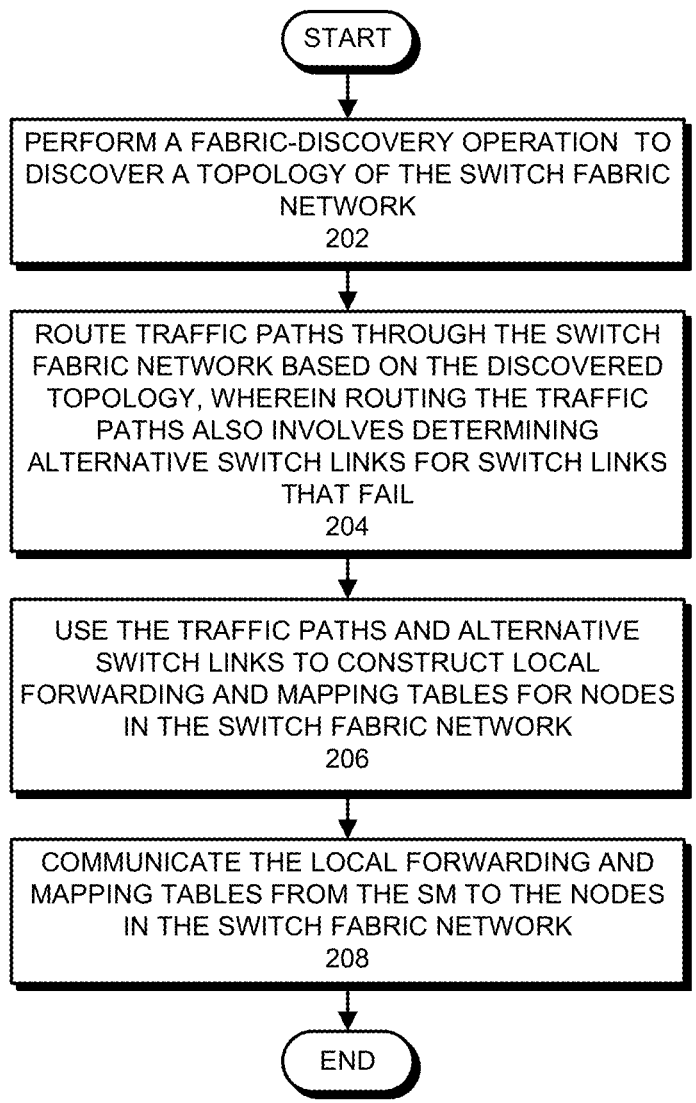
FIG. 2 presents a flow chart illustrating how a subnet manager performs system-initialization operations in accordance with an embodiment of the present disclosure.
Figure 3:
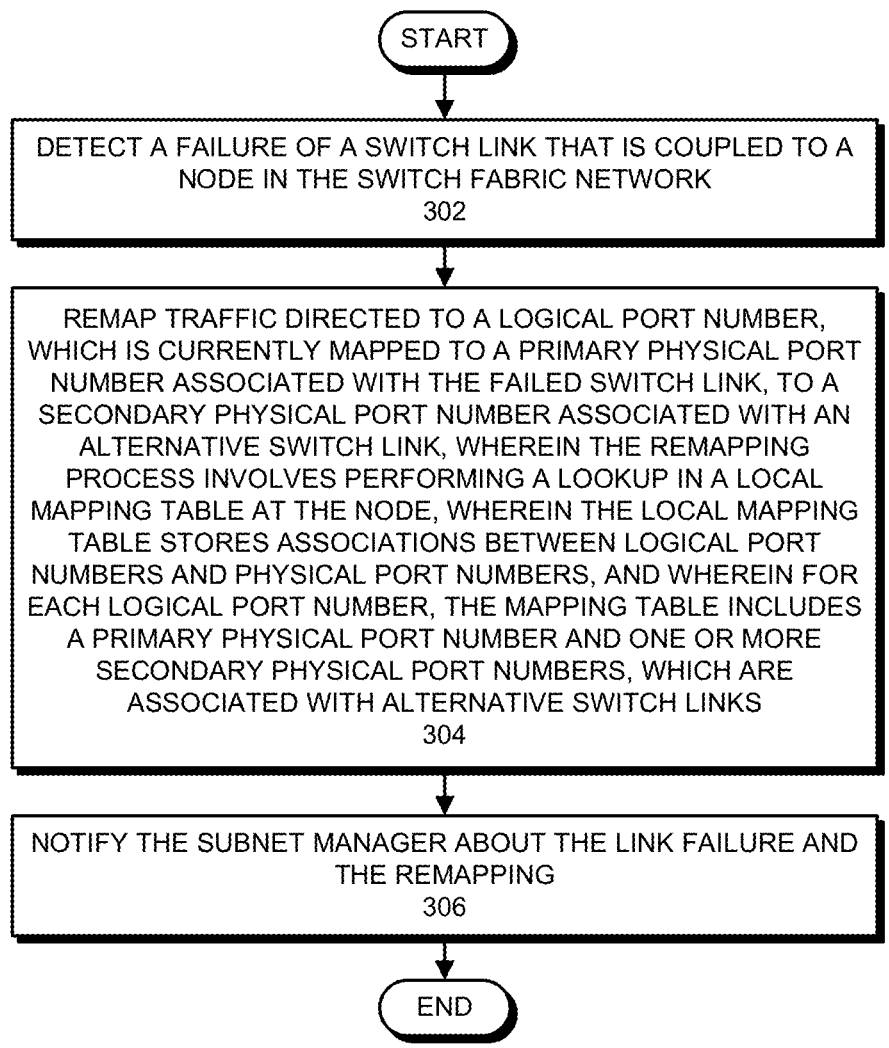
FIG. 3 presents a flow chart illustrating the process of handling a failure of a switch link in a switch fabric network in accordance with an embodiment of the present disclosure.
Figure 4:
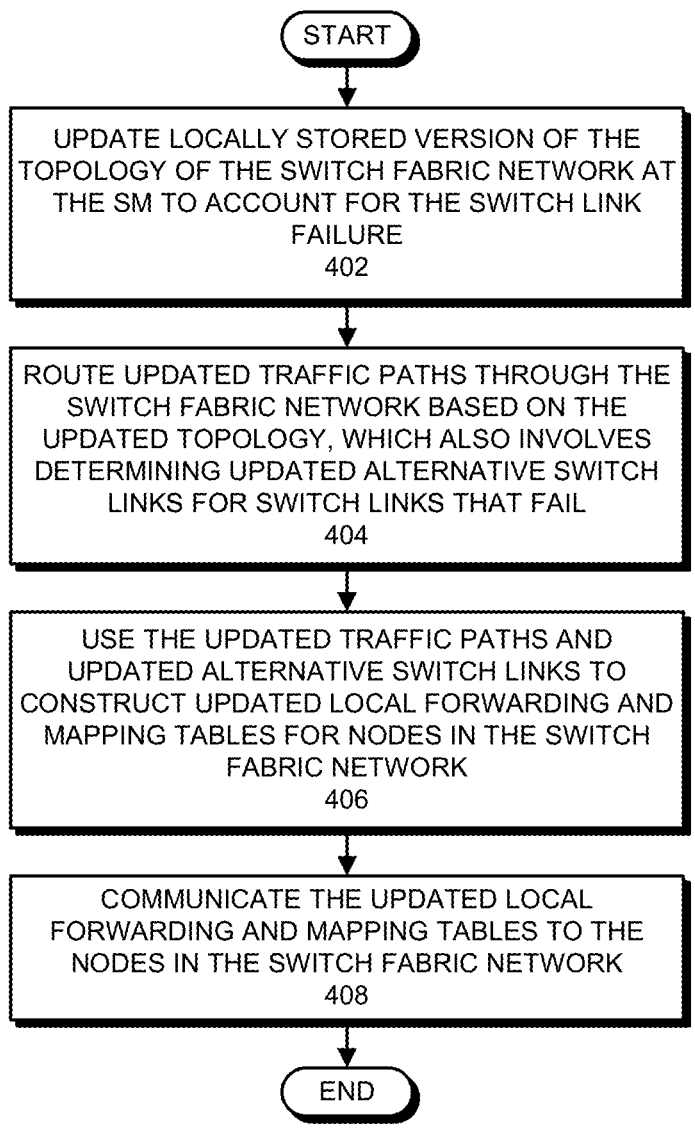
FIG. 4 presents a flow chart illustrating how a subnet manager reconfigures a switch fabric network after a switch link failure in accordance with an embodiment of the present disclosure.

FIGS. 2-4 present flow charts illustrating operations performed by the framework. First, FIG. 2 presents a flow chart illustrating how an SM performs system-initialization operations in accordance with an embodiment of the present disclosure. During these system-initialization operations, the SM performs a fabric-discovery operation to discover a topology of the switch fabric network (step 202). Next, the SM routes traffic paths through the switch fabric network based on the discovered topology, wherein routing the traffic paths also involves determining alternative switch links for switch links that fail (step 204). The SM then uses the traffic paths and alternative switch links to construct local forwarding and mapping tables for nodes in the switch fabric network (step 206). Finally, the SM communicates the local forwarding and mapping tables to the nodes in the switch fabric network (step 208).

FIG. 3 presents a flow chart illustrating the process of handling a failure of a switch link in a switch fabric network in accordance with an embodiment of the present disclosure. First, a node in the switch fabric network detects a failure of a switch link that is coupled to the node (step 302). In response to detecting this failure, the node remaps traffic directed to a logical port number, which is currently mapped to a primary physical port number associated with the failed switch link, to a secondary physical port number associated with an alternative switch link, wherein the remapping process involves performing a lookup in a local mapping table at the node, wherein the local mapping table stores associations between logical port numbers and physical port numbers, and wherein for each logical port number, the mapping table includes a primary physical port number and one or more secondary physical port numbers, which are associated with alternative switch links (step 304). Finally, the node notifies the SM about the link failure and the remapping (step 306).

FIG. 4 presents a flow chart illustrating how the SM reconfigures a switch fabric network after a switch link failure in accordance with an embodiment of the present disclosure. After the SM is notified about a switch link failure and the associated remapping, the SM updates its locally stored version of the topology of the switch fabric network to account for the switch link failure (step 402). Next, the SM routes updated traffic paths through the switch fabric network based on the updated topology, which also involves determining updated alternative switch links for switch links that fail (step 404). The SM then uses the updated traffic paths and updated alternative switch links to construct updated local forwarding and mapping tables for nodes in the switch fabric network (step 406). Finally, the SM communicates the updated local forwarding and mapping tables to the nodes in the switch fabric network (step 408).

Failover Operations Involving Redundant Switch Links Among Nodes

Figure 5:
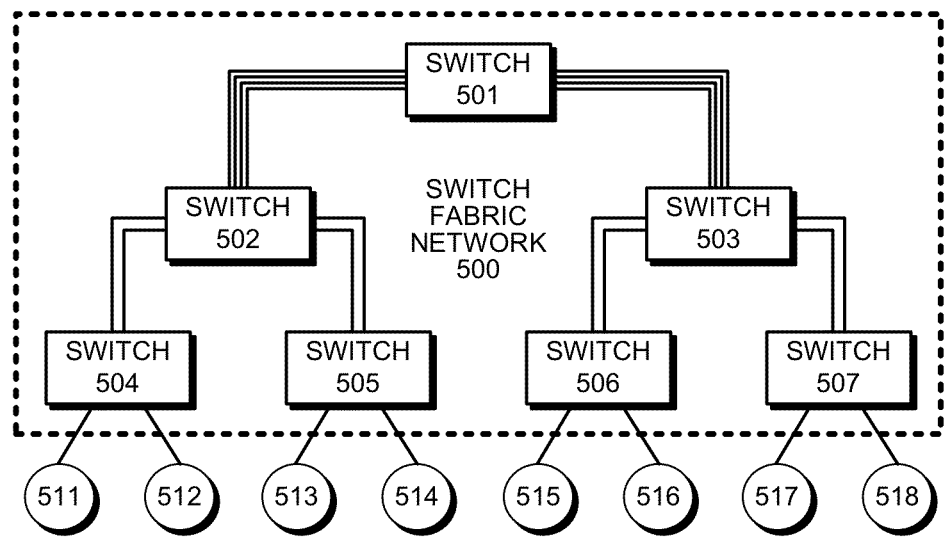
FIG. 5 illustrates an exemplary switch fabric network that is implemented as a fat binary tree in accordance with the disclosed embodiments.

In many switch network topologies, two switches are directly connected by two or more redundant switch links. For example, FIG. 5 illustrates an exemplary switch fabric network 500, which is structured as a fat binary tree comprising switches 501-507, which connect end nodes 511-518. To alleviate bandwidth bottlenecks, switches at higher levels of the fat binary tree are connected with multiple switch links. More specifically, switch 504 is connected to switch 502 through two switch links, switch 505 is connected to switch 502 through two switch links, switch 506 is connected to switch 503 through two switch links, switch 507 is connected to switch 503 through two switch links, switch 502 is connected to switch 501 through four switch links, and switch 503 is connected to switch 501 through four switch links.

For the special case where two nodes are connected through a set of multiple redundant switch links, if one of the switch links fails, the traffic from the failed link can be rerouted to an alternative switch link in the set of multiple redundant switch links. There are two modes of operation for this failover process: (1) active-passive mode; and (2) active-active mode.

In the active-passive mode of operation, the failed switch link is an active switch link that is presently carrying network traffic, and the failover operation transfers this network traffic to an alternative passive switch link that is presently not carrying network traffic. In this case, the passive link simply takes over whenever the active link fails, and the traffic profile remains the same; it just shifts from the active link to the passive link as is.

In contrast, during the active-active mode of operation, the failed switch link is an active switch link that is presently carrying network traffic, and the failover operation transfers the network traffic to one or more alternative active switch links that are also presently carrying network traffic. In this case, the failover moves traffic from the failed link to at least one alternative active link, thereby affecting existing traffic profiles. To ensure that quality-of-service (QoS) requirements are met, the SM may get involved to reshape network traffic. Note that this involvement of the SM may not be scalable for large fabrics because of capacity constraints for the SM. Decisions that affect QoS can be determined a priori or can be user-controlled. Also, if links are associated with fixed resources, it may not be possible for the QoS resources to be readjusted.

Figure 6:
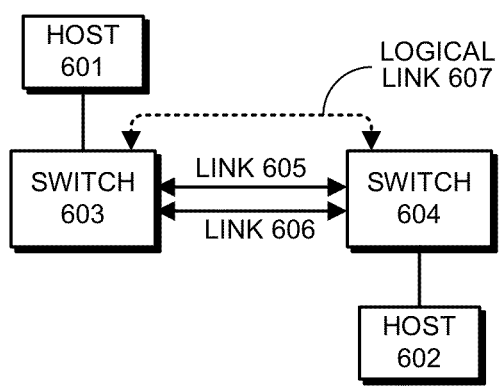
FIG. 6 illustrates exemplary switches that are directly connected through redundant switch links in accordance with the disclosed embodiments.

The disclosed embodiments provide a framework for managing QoS and resource reallocation in a scalable manner for an active-active failover scenario. This framework builds on the above-described technique for automatic failover without intervention from the SM. For example, FIG. 6 illustrates an exemplary simple switch fabric network topology, which is a subset of the previously described fat tree network topology. In this simple topology, host 601 has a port connected to switch 603, host 602 has a port connected to switch 604, and switch 603 is connected to switch 604 through two switch links 605 and 606. Moreover, switch link 605 is a primary switch link that connects switch 603 to switch 604, and switch link 606 is a secondary failover switch link. Note that switch links 605 and 606 can either be in active-passive mode or active-active mode. Moreover, the cost and performance associated with each mode may vary, and a system administrator needs to consider system-level deployment use cases to decide what mode to use.

The active-passive mode of operation is a relatively straightforward scenario that involves provisioning additional physical links during system deployment. At system configuration time, the switch subnet management agent (SMA) and other low-level firmware can detect these links and present to the SM an abstract view that describes only logical ports. In this mode, resources are statically provisioned, and the QoS and bandwidth remain the same before and after the failover. In this scenario, switch link 606 is a physical link that is used as a failover link.

During the active-active mode of operation, the same alternative physical link carries failover traffic, and also other traffic that was passing through it prior to the failover. In order to prevent any blocking behavior (due to failover traffic interference) and to provide QoS, the alternative links are provisioned with private virtual lanes (pVLs), which comprise resources that are either statically allocated to a given port or dynamically allocated from another port. For example, during a failover operation, virtual lane buffers and associated resources can move from the inactive port associated with the failed link to an active port associated with the alternative link.

In some embodiments, pVLs are not visible to or managed by the SM in any manner. Instead, pVLs are managed between the switches either through a side-band management interface or through in-band vendor-defined messages. Moreover, in the example illustrated in FIG. 6, failover switch link 606 may be associated with pVLs that are either statically or dynamically allocated from other links to carry failover traffic. Given the dynamic nature of pVLs, this framework can scale up to provide any number of pVLs for each link, and is limited only by on-chip resources.

Once the pVLs are negotiated and configured among the physical links, the pVLs get used in the mapping tables (as described below). Note that header manipulations may take place at the link level that are done/produced (at the egress port) and undone/consumed (at the corresponding ingress port)—for example, such manipulations may involve virtual lane (VL) and service level (SL) fields in the packet headers.

In the case where such logical link aggregations are handled transparently to the SM, the switches can support a wire-protocol scheme among neighbor nodes to detect mutual connectivity across multiple links, and to maintain a common understanding of logical to physical link (and virtual lane) mappings. Moreover, the attributes of the aggregated logical link in terms of overall aggregated bandwidth as well as number of logical VLs can be provided to the SM, which enables the SM to balance traffic and maintain relevant flow separation.

In some embodiments, to avoid deadlocks while remapping the network traffic, the system ensures that the SM will never see a set of independent logical virtual lanes that map to the same underlying virtual lane associated with the same physical port. Also, the SM may be made aware of the logical aggregations to take advantage of options for balancing and flow separation in the non-degraded case, and to still be able to ensure deadlock avoidance in the general case.

To eliminate the overhead of upper-level software processing, each switch port maintains a mapping table on top of the various forwarding tables. This mapping table provides a translation from a logical port and logical virtual lane to a corresponding physical port and pVL. When a switch subsequently detects a failure of a switch link associated with a physical port, which has been configured with alternative redundant ports, the low-level mapping table is changed so that traffic that was previously directed to the physical port is redirected to an alternative redundant port.

In the example illustrated in FIG. 6, suppose switches 603 and 604 are connected with a logical link 607, which is associated with an underlying physical link 605, and a failover physical link 606. When switch 603 detects a failure of physical link 605, the mapping table is changed autonomously so that physical link 606 takes over to carry traffic for logical link 607. Note that when a logical link is remapped to another physical link, no global changes to the switch forwarding tables are required. The traffic continues to originate from host 601 and be received at host 602 as before without any global rerouting or traffic remapping.

In some embodiments, while managing the QoS requirements, the system allocates switch link bandwidth on a per-flow basis, wherein each flow is defined based on one or more of the following attributes of network packets that comprise the flow: a source address, a destination address, an interface identifier, a session identifier, an application identifier, a user identifier, and a group identifier. In these embodiments, a representative translation involving a pVL can involve the following mappings.

PacketHeaders→Flow→{LogicalPort, LogicalDestVL}→MappingTable→{PhysicalPort, Private DestVL}

Hence, during a failover operation, network traffic from a failed link can be partitioned based on "flows," and these flows can be split among one or more alternative redundant switch links.

The framework described above can be extended to control multiple failover links to manage QoS and bandwidth allocation. To maintain flow affinity when choosing a final physical port, the above-described process can be extended to include a "flow hash," which can be configured based on different QoS and bandwidth policies.

PacketHeaders→Flow→Hash[QoS-Policy]→FlowHash
PacketHeaders→Flow→{LogicalPort, LogicalDestVL}→MappingTable[FlowHash]→{PhysicalPort, PrivateDestVL}

This technique can be further extended across multiple hierarchies of switches and also within HCAs/NICs where there are multiple hardware-based vSwitches/physical ports.

Figure 7:
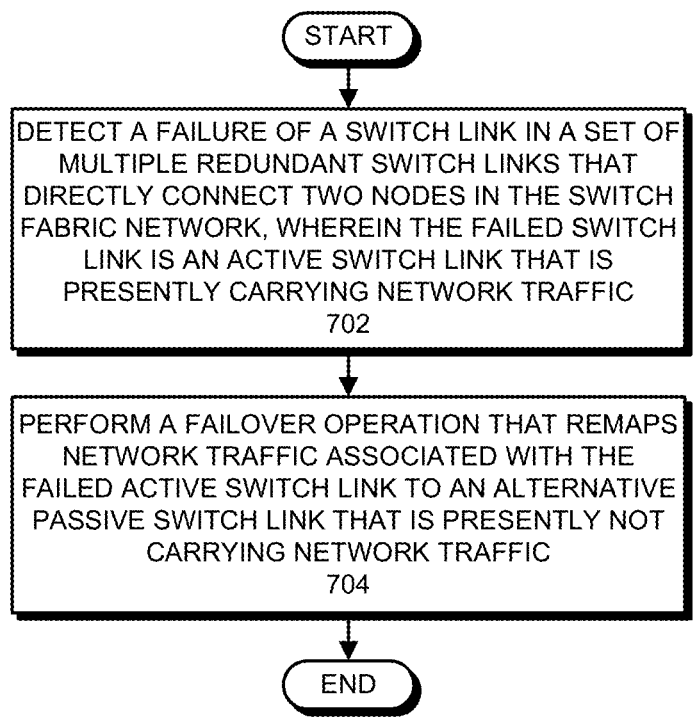
FIG. 7 presents a flow chart illustrating how a failover takes place during an active-passive mode of operation in accordance with an embodiment of the present disclosure.
Figure 8:
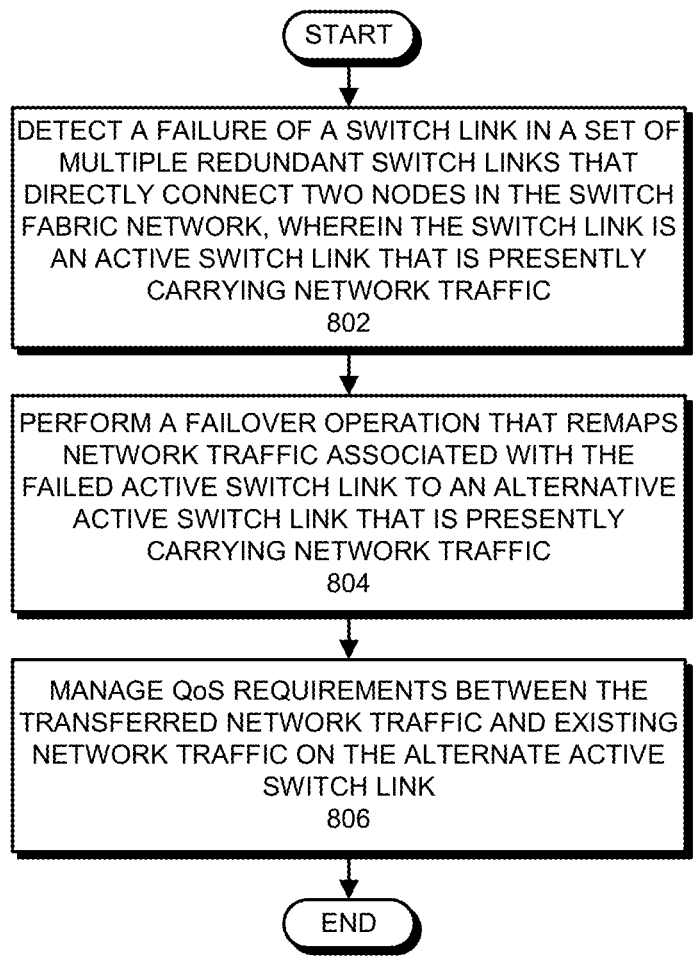
FIG. 8 presents a flow chart illustrating how a failover takes place during an active-active mode of operation in accordance with an embodiment of the present disclosure.
Figure 9:
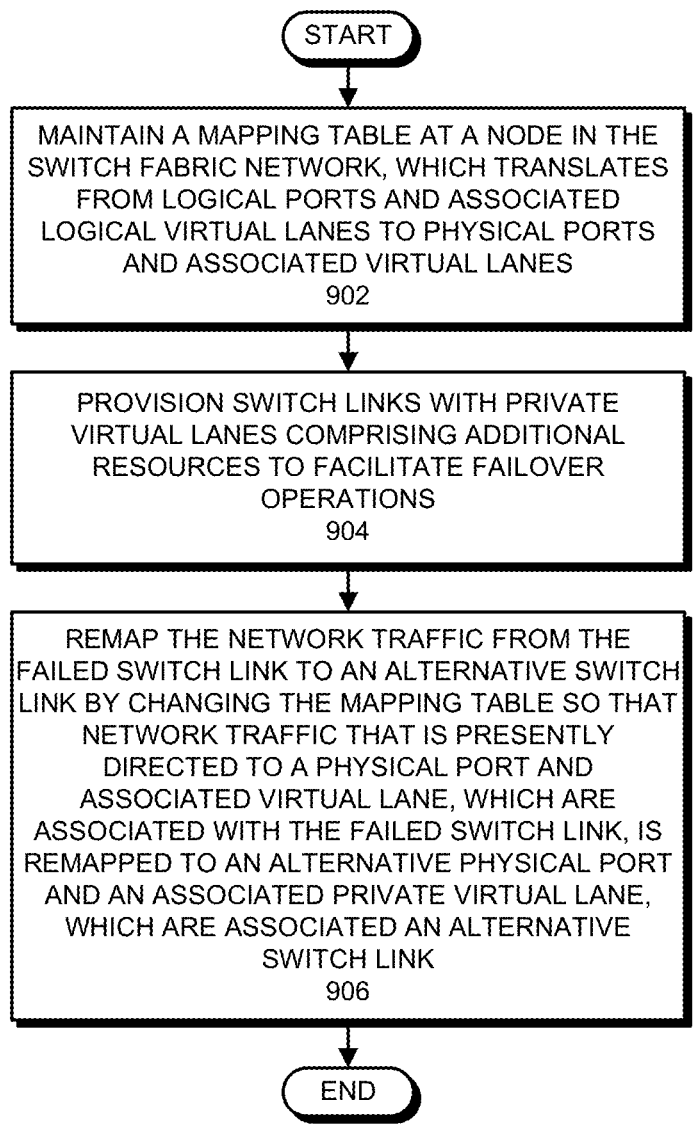
FIG. 9 presents a flow chart illustrating how private virtual lanes are used while performing a failover operation in accordance with an embodiment of the present disclosure.

FIGS. 7-9 present flow charts illustrating operations performed by the system during failover operations involving multiple redundant switch links that directly connect two nodes in the switch fabric network. In particular, FIG. 7 presents a flow chart illustrating how a failover takes place during the active-passive mode of operation in accordance with an embodiment of the present disclosure. First, the system detects a failure of a switch link in a set of multiple redundant switch links that directly connect two nodes in the switch fabric network, wherein the failed switch link is an active switch link that is presently carrying network traffic (step 702). Next, the system performs a failover operation that remaps network traffic associated with the failed active switch link to an alternative passive switch link that is presently not carrying network traffic (step 704).

FIG. 8 presents a flow chart illustrating how a failover takes place during an active-active mode of operation in accordance with an embodiment of the present disclosure. First, the system detects a failure of a switch link in a set of multiple redundant switch links that directly connect two nodes in the switch fabric network, wherein the switch link is an active switch link that is presently carrying network traffic (step 802). Next, the system performs a failover operation that remaps network traffic associated with the failed active switch link to an alternative active switch link that is presently carrying network traffic (step 804). (For example, suppose that the failed switch link was carrying traffic for 16 virtual lanes, and the alternative active switch link was also carrying traffic for 16 virtual lanes. After the failover operation, the alternative switch link would be carrying traffic for all 32 virtual lanes.) After the failover operation completes, the system subsequently manages QoS requirements between the transferred network traffic and existing network traffic on the alternative active switch link (step 806).

Finally, FIG. 9 presents a flow chart illustrating how private virtual lanes are used while performing a failover operation in accordance with an embodiment of the present disclosure. During this process, the system maintains a mapping table at a node in the switch fabric network, which translates from logical ports and associated logical virtual lanes to physical ports and associated virtual lanes (step 902). The system also provisions switch links with private virtual lanes comprising additional resources to facilitate failover operations (step 904). Next, the system remaps the network traffic from the failed switch link to an alternative switch link by changing the mapping table so that network traffic that is presently directed to a physical port and associated virtual lane, which are associated with the failed switch link, is remapped to an alternative physical port and an associated private virtual lane, which are associated with an alternative switch link (step 906).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for handling a switch link failure in a switch fabric network, comprising:
  when a node in the switch fabric network detects a failure of a switch link coupled to the node, performing local operations at the node to move traffic from the failed switch link to an alternative switch link by:
    remapping traffic directed to a logical port number, which is currently mapped to a primary physical port number associated with the failed switch link, to a secondary physical port number associated with the alternative switch link;
    wherein the remapping involves performing a lookup in a local mapping table at the node, wherein the local mapping table stores associations between logical port numbers and physical port numbers, and wherein for each logical port number, the mapping table includes a primary physical port number and one or more secondary physical port numbers, which are associated with alternative switch links; and
    notifying a subnet manager (SM) for the switch fabric network about the link failure and the remapping.

2. The method of claim 1, wherein during a system-initialization phase prior to detecting the failure of the switch link, the method further comprises:
  performing a fabric-discovery operation from the SM to discover a topology of the switch fabric network;
  routing traffic paths through the switch fabric network based on the discovered topology, wherein routing the traffic paths also involves determining alternative switch links for switch links that fail;
  using the traffic paths and alternative switch links to construct local forwarding and mapping tables for nodes in the switch fabric network; and
  communicating the local forwarding and mapping tables from the SM to the nodes in the switch fabric network.

3. The method of claim 2, wherein determining the alternative switch links involves ensuring that cycles are not created by the alternative switch links.

4. The method of claim 1, wherein after the SM is notified about the switch link failure and associated remapping, the method further comprises:
  updating the topology of the switch fabric network at the SM to account for the switch link failure;
  routing updated traffic paths through the switch fabric network based on the updated topology, which also involves determining updated alternative switch links for switch links that fail;
  using the updated traffic paths and updated alternative switch links to construct updated local forwarding and mapping tables for nodes in the switch fabric network; and
  communicating the updated local forwarding and mapping tables from the SM to the nodes in the switch fabric network.

5. The method of claim 1, wherein the node in the switch fabric comprises one of:
  a switch in the switch fabric network; and
  an end node in the switch fabric network.

6. The method of claim 5, wherein an end node in the switch fabric comprises one of:
  a server; and
  a storage device.

7. The method of claim 1, wherein the switch fabric network comprises an InfiniBand™ switch fabric network.

8. A non-transitory computer-readable storage medium storing instructions that when executed by a computer cause the computer to perform a method for handling a switch link failure in a switch fabric network, the method comprising:
  when a node in the switch fabric network detects a failure of a switch link coupled to the node, performing local operations at the node to move traffic from the failed switch link to an alternative switch link by:
    remapping traffic directed to a logical port number, which is currently mapped to a primary physical port number associated with the failed switch link, to a secondary physical port number associated with the alternative switch link;
    wherein the remapping involves performing a lookup in a local mapping table at the node, wherein the local mapping table stores associations between logical port numbers and physical port numbers, and wherein for each logical port number, the mapping table includes a primary physical port number and one or more secondary physical port numbers, which are associated with alternative switch links; and
    notifying a subnet manager (SM) for the switch fabric network about the link failure and the remapping.

9. The non-transitory computer-readable storage medium of claim 8, wherein during a system-initialization phase prior to detecting the failure of the switch link, the method further comprises:
  performing a fabric-discovery operation from the SM to discover a topology of the switch fabric network;
  routing traffic paths through the switch fabric network based on the discovered topology, wherein routing the traffic paths also involves determining alternative switch links for switch links that fail;
  using the traffic paths and alternative switch links to construct local forwarding and mapping tables for nodes in the switch fabric network; and communicating the local forwarding and mapping tables from the SM to the nodes in the switch fabric network.

10. The non-transitory computer-readable storage medium of claim 9, wherein determining the alternative switch links involves ensuring that cycles are not created by the alternative switch links.

11. The non-transitory computer-readable storage medium of claim 8, wherein after the SM is notified about the switch link failure and associated remapping, the method further comprises:
updating the topology of the switch fabric network at the SM to account for the switch link failure;
routing updated traffic paths through the switch fabric network based on the updated topology, which also involves determining updated alternative switch links for switch links that fail;
using the updated traffic paths and updated alternative switch links to construct updated local forwarding and mapping tables for nodes in the switch fabric network; and
communicating the updated local forwarding and mapping tables from the SM to the nodes in the switch fabric network.

12. The non-transitory computer-readable storage medium of claim 8, wherein the node in the switch fabric comprises one of:
a switch in the switch fabric network; and
an end node in the switch fabric network.

13. The non-transitory computer-readable storage medium of claim 12, wherein an end node in the switch fabric comprises one of:
a server; and
a storage device.

14. The non-transitory computer-readable storage medium of claim 1, wherein the switch fabric network comprises an InfiniBand™ switch fabric network.

15. A system that handles a switch link failure in a switch fabric network, comprising:
a local failover mechanism located at a node in the switch fabric network, wherein when the node detects a failure of a switch link coupled to the node, the local failover mechanism performs local operations at the node to move traffic from the failed switch link to an alternative switch link, wherein the local operations involve:
remapping traffic directed to a logical port number, which is currently mapped to a primary physical port number associated with the failed switch link, to a secondary physical port number associated with the alternative switch link;
wherein the remapping involves performing a lookup in a local mapping table at the node, wherein the local mapping table stores associations between logical port numbers and physical port numbers, and wherein for each logical port number, the mapping table includes a primary physical port number and one or more secondary physical port numbers, which are associated with alternative switch links; and
notifying a subnet manager (SM) for the switch fabric network about the link failure and the remapping.

16. The system of claim 15, further comprising a global failover mechanism at the subnet manager, wherein during a system-initialization phase prior to detecting the failure of the switch link, the global failover mechanism:
performs a fabric-discovery operation from the SM to discover a topology of the switch fabric network;
routes traffic paths through the switch fabric network based on the discovered topology, wherein routing the traffic paths also involves determining alternative switch links for switch links that fail;
uses the traffic paths and alternative switch links to construct local forwarding and mapping tables for nodes in the switch fabric network; and
communicates the local forwarding and mapping tables from the SM to the nodes in the switch fabric network.

17. The system of claim 16, wherein while determining the alternative switch links, the global failover mechanism ensures that cycles are not created by the alternative switch links.

18. The system of claim 16, wherein after the SM is notified about the switch link failure and associated remapping, the global failover mechanism:
updates the topology of the switch fabric network at the SM to account for the switch link failure;
routes updated traffic paths through the switch fabric network based on the updated topology, which also involves determining updated alternative switch links for switch links that fail;
uses the updated traffic paths and updated alternative switch links to construct updated local forwarding and mapping tables for nodes in the switch fabric network; and
communicates the updated local forwarding and mapping tables from the SM to the nodes in the switch fabric network.

19. The system of claim 15, wherein the node in the switch fabric comprises one of:
a switch in the switch fabric network; and
an end node in the switch fabric network.

20. The method of claim 1, wherein the switch fabric network comprises an InfiniBand™ switch fabric network.

\* \* \* \* \*